US006688460B2

(12) United States Patent
Kim

(10) Patent No.: US 6,688,460 B2
(45) Date of Patent: Feb. 10, 2004

(54) CUP TRANSFER DEVICE FOR VENDING MACHINE

(75) Inventor: Jung-gi Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 59 days.

(21) Appl. No.: 10/074,707

(22) Filed: Feb. 13, 2002

(65) Prior Publication Data

US 2002/0124908 A1 Sep. 12, 2002

(30) Foreign Application Priority Data

Mar. 8, 2001 (KR) ........................................ 2001-11957
Jul. 10, 2001 (KR) ........................................ 2001-41127

(51) Int. Cl.[7] ................................................ B65G 25/00
(52) U.S. Cl. ..................... 198/750.1; 141/174; 141/190
(58) Field of Search .............................. 198/750.1, 794, 198/832.1; 141/155, 164, 174, 190, 191; 221/96, 92, 123; 222/144.5, 129, 129.1

(56) References Cited

U.S. PATENT DOCUMENTS 3,860,108 A * 1/1975 Farfaglia ................. 198/832.1
3,951,303 A 4/1976 Hobden et al.
4,318,465 A * 3/1982 Calvert et al. ......... 1987/832.1
4,558,802 A 12/1985 Molison
4,564,123 A 1/1986 Noshi
4,625,776 A * 12/1986 Mikkelsen .................. 141/174
5,261,467 A * 11/1993 Yamamoto et al. .......... 141/174
5,400,838 A * 3/1995 Schjerven et al. .......... 141/174
6,116,460 A 9/2000 Kim et al.
6,213,174 B1 * 4/2001 Cook et al. ................. 141/174

FOREIGN PATENT DOCUMENTS

| | | |
|---|---|---|
| CN | 1202676 | 12/1998 |
| DE | 7014972 | 7/1970 |
| GB | 835285 | 5/1960 |

* cited by examiner

*Primary Examiner*—Joseph E. Valenza
(74) *Attorney, Agent, or Firm*—Ladas & Parry

(57) ABSTRACT

A cup transfer device of a vending machine can prevent the cup transfer device, peripheral objects or the device motor from being damaged, even when an abnormal case is encountered, thereby preventing the cup holder from rotating actively. The cup transfer device comprises a cup holder; means for driving the cup holder; and means for selectively controlling power transmitted from the driving means to the cup holder. The driving means comprises a motor and a rotary shaft driven by the motor. The driving control means includes a first clutch disk connected with the rotary shaft for moving in an axial direction; a second clutch disk secured to the cup holder; and a resilient member for urging the first clutch disk toward the second clutch disk.

3 Claims, 5 Drawing Sheets

CUP TRANSFER DEVICE FOR VENDING MACHINE

BACKGROUND OF THE INVENTION

1. Field of the Invention

The present invention relates generally to a vending machine, and more particularly to a cup transfer device for use in a vending machine that transfers a supplied cup from a cup supply device between a cup supply unit and a low material discharging hole.

2. Description of the Related Art

A conventional cup transfer device 10 of a vending machine is shown in FIG. 1. The cup transfer device 10 of the vending machine shown in FIG. 1 is an undisclosed prior art of the applicant, and thus, it cannot be used as prior art against the present invention.

Referring to FIG. 1, the conventional cup transfer device 10 of the vending machine comprises a cup holder 20 and a driving means 30. A cup holding unit 22 is formed at the cup holder 20 for embracing a cup 40 supplied by a cup supply device 50.

The driving means 30 includes a motor 32 and a gear box 34. The rotation force of the motor 32 is amplified by the gear box 34, and is transferred through a rotary shaft 36 to the cup holder 20. Accordingly, the cup holder 20 secured to the rotary shaft 36 rotates.

For the conventional cup transfer device 10 of the vending machine with the above construction, if the rotary shaft 36 is rotated by the motor 32, the cup holder 20 secured to the rotary shaft 36 rotates and the cup 40 is moved between the cup supply unit 50 and an ice cream discharge hole 60 of the vending machine.

However, according to the conventional cup transfer device 10 of a vending machine with the above construction, if an abnormal case is encountered that hinders rotation of the cup holder 20 or a malfunction occurs, there is no means to correct the operation of the device.

Examples of device malfunction can be encountered when the cup 40 is separated from the cup holding unit 22 or when the cup 40 that is in the cup holding unit 22 is not in good condition. In another example, the cup 40 might be stuck between the cup transfer device 10 and peripheral objects of the ice cream vending machine (not shown).

In the case of a malfunction, if the motor 32 continues its operation, it can damage the cup transfer device 10, the peripheral objects, or the motor 32. In addition, if a user's hand is inserted in the vending machine while the cup transfer device 10 is operating, the user might hurt his/her hand.

SUMMARY OF THE INVENTION

The present invention has been made to overcome the above-mentioned problems of the related art. Accordingly, it is an object of the present invention to provide a cup transfer device of a vending machine capable of preventing the cup transfer device, peripheral objects, and a motor from being damaged, even when an abnormal rotation of the cup holder is occurred.

Another object of the present invention is to provide a cup transfer device of a vending machine that can secure the safety of a user from the cup transfer device, even when the user's hand is inserted into the vending machine carelessly during the cup transfer device is operating.

The above object of the present invention is accomplished by providing a cup transfer device of a vending machine comprising a cup holder; means for driving the cup holder; and means for selectively controlling power transmitted from the driving means to the cup holder.

In the preferred embodiment of the present invention, the driving means comprises a motor and a rotary shaft driven by the motor. The cup holder is rotatably connected with the rotary shaft. The power control means includes a first clutch disk connected with the rotary shaft capable of moving in an axial direction, a second clutch disk secured to the cup holder, and a resilient member for urging the first clutch disk in the direction of the second clutch disk.

In the preferred embodiment, the above object of the present invention is accomplished by providing a cup transfer device of a vending machine comprising a motor; a rotary shaft driven by the motor; a cup holder rotatably connected with the rotary shaft; a first clutch disk connected with the rotary shaft capable of moving in an axial direction; a second clutch disk secured to the cup holder; and a resilient member for urging the first clutch disk in the direction of the second clutch disk. The first clutch disk and the second clutch disk may comprise uneven members for engaging with each other by sides sloping relative to their respective axes.

DETAILED DESCRIPTION OF THE PREFERRED EMBODIMENT

From now on, the preferred embodiment of the present invention will be described by referring to the accompanying drawings.

Figure 1:
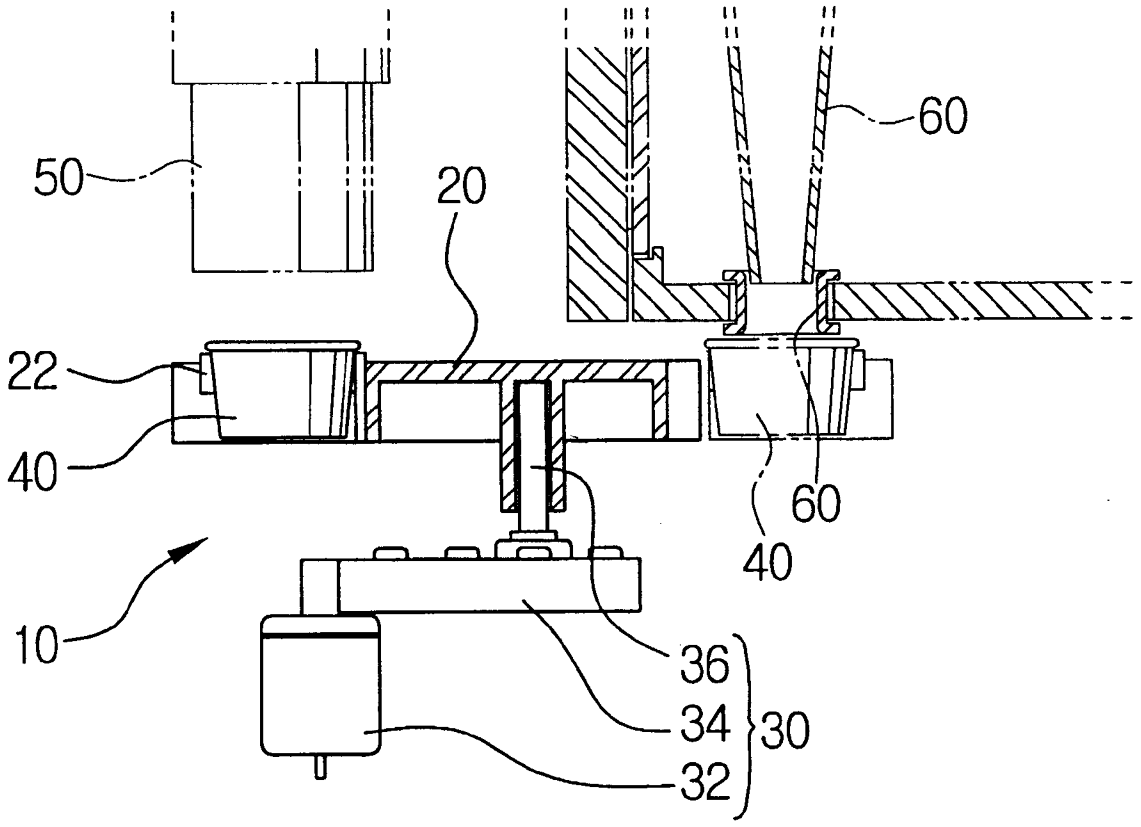
FIG. 1 PRIOR ART
FIG. 1 is a sectional view showing a conventional cup transfer device of a vending machine.
Figure 2:
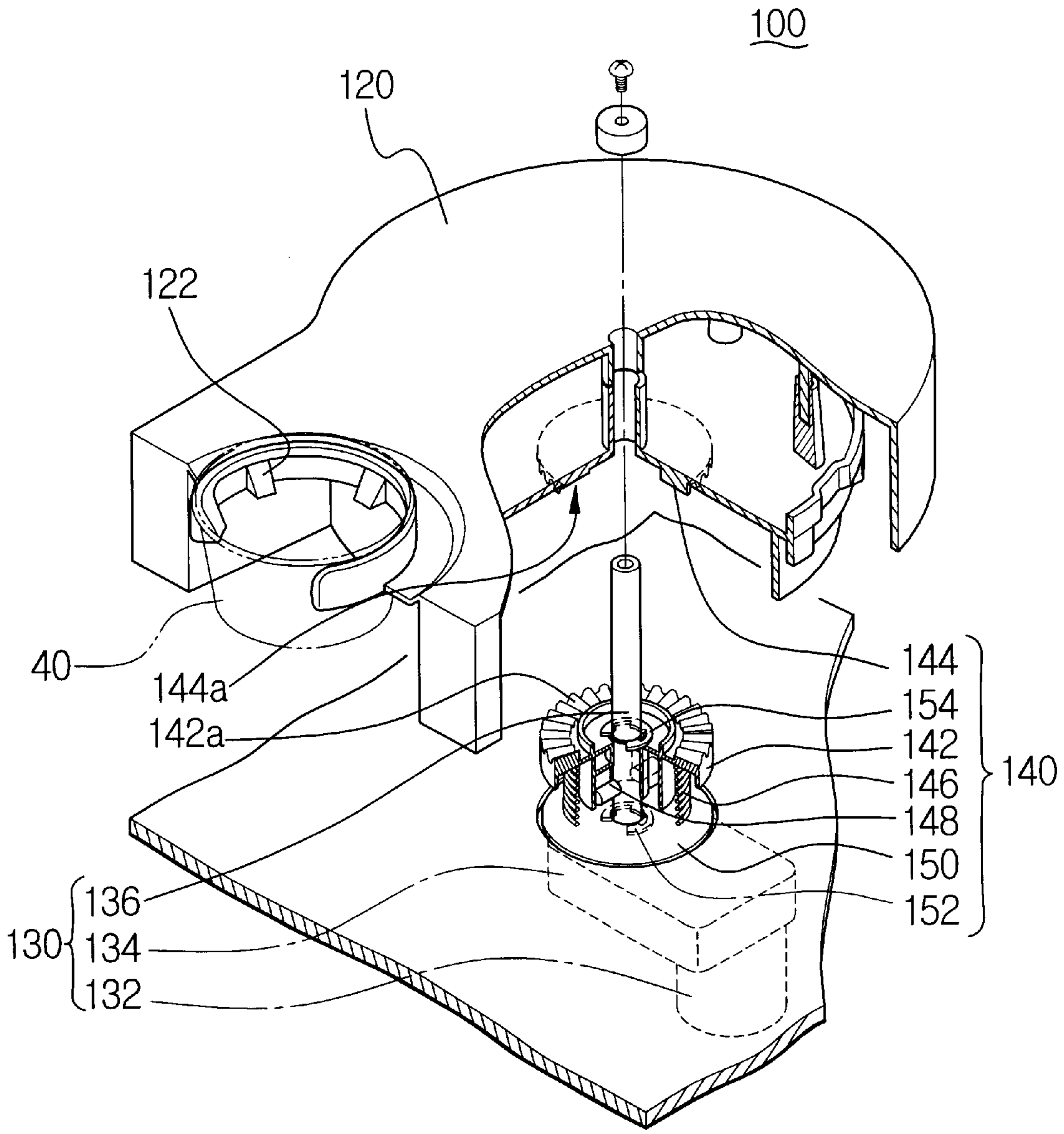
FIG. 2 is an perspective view showing in exploded partial cutaway an important part of a cup transfer device according to the present invention.
Figure 3:
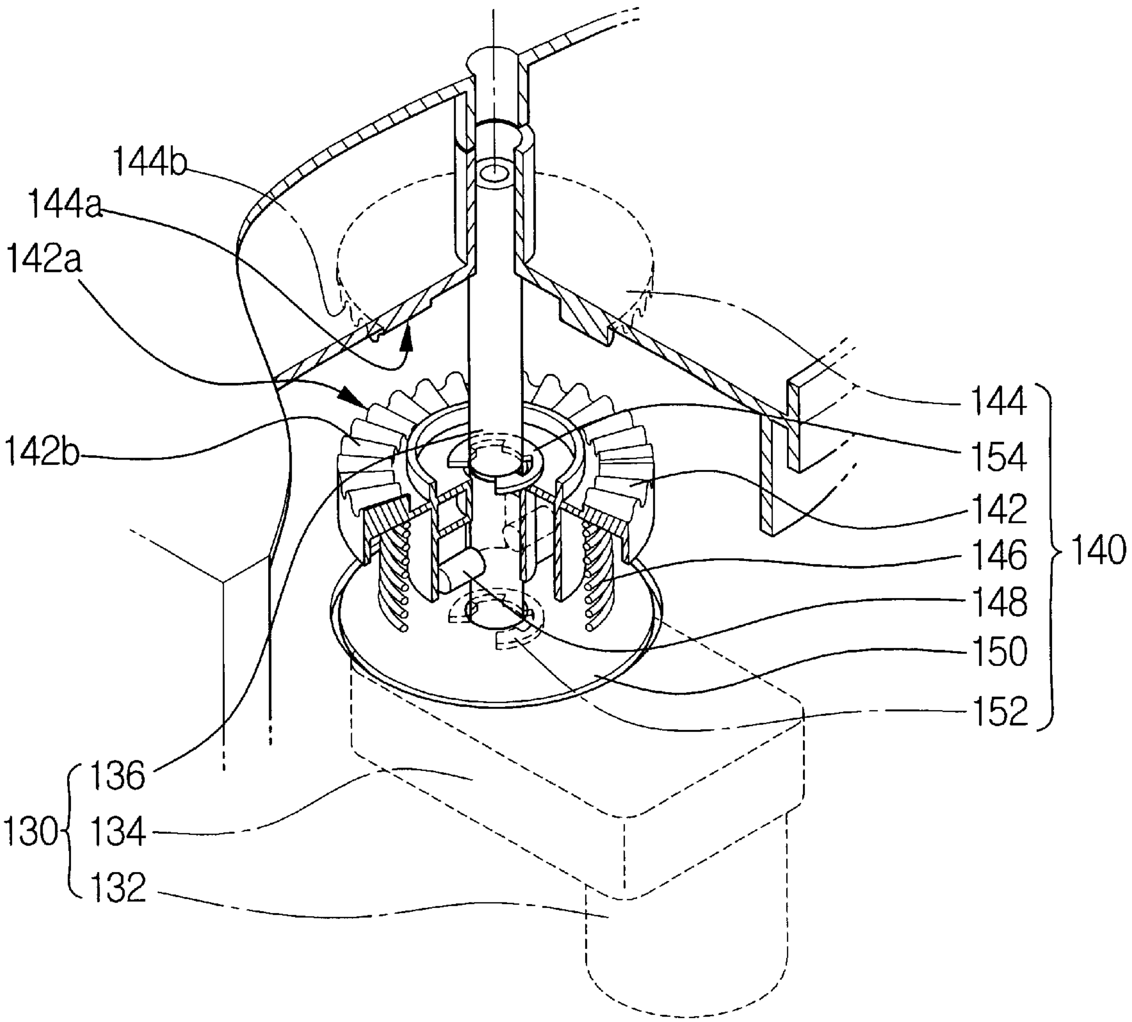
FIG. 3 is a detail view of FIG. 2 showing an important part of the invention.
Figure 4:
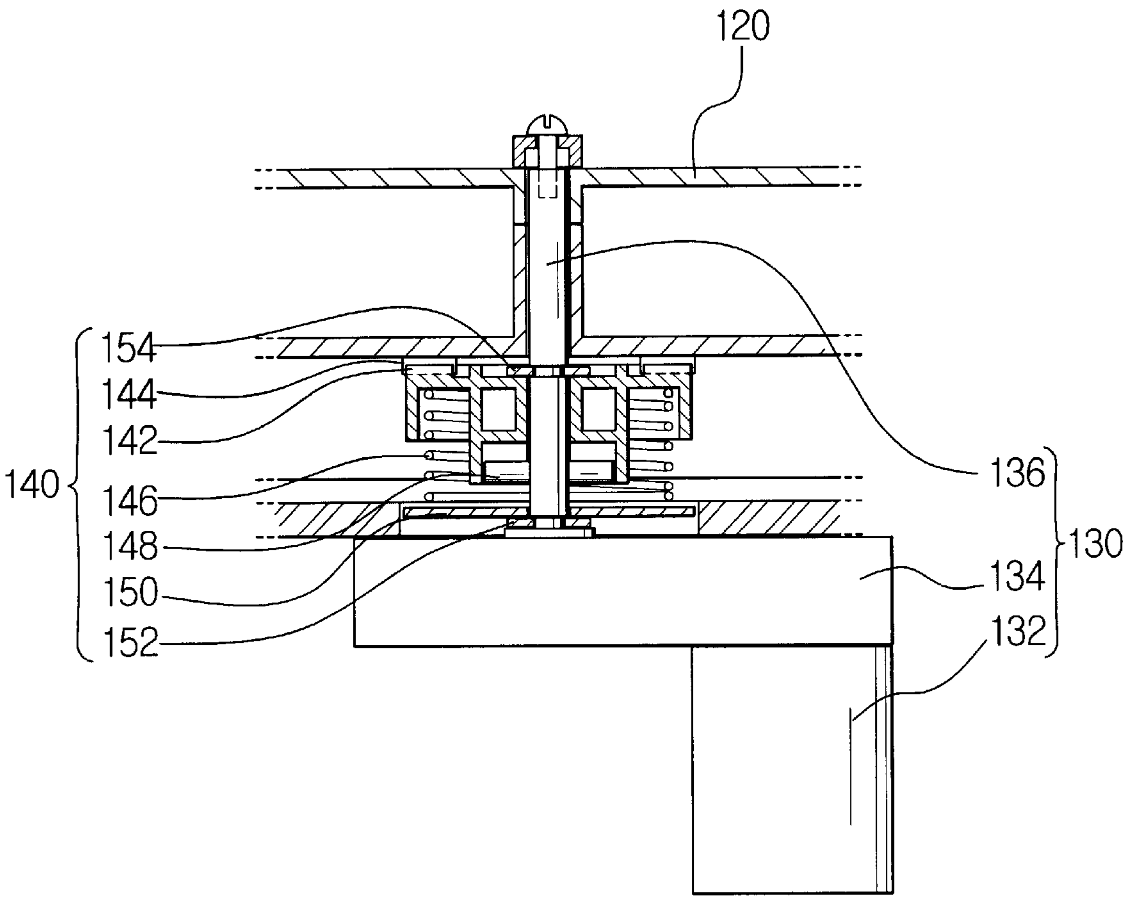
FIG. 4 is a cross-sectional view showing the cup transfer device of FIG. 2 after assembly.

A cup transfer device 100 of a vending machine according to the present invention is shown in FIGS. 2 through 4. According to the FIGS. 2 through 4, the cup transfer device 100 of the vending machine according to the present invention comprises a cup holder 120, driving means 130, and power control means 140.

A cup holding unit 122 for embracing a cup 40 is mounted on the cup holder 120. The driving means 130 includes a motor 132 and a gear box 134. A rotation force of the motor 132 is amplified by the gear box 134, and output through a rotary shaft 136.

The cup holder 120 is rotatably connected with the rotary shaft 136. The power control means 140 is inserted between the cup holder 120 and the rotating shaft 136 for selectively transmitting a rotation force of the rotating shaft 136 to the cup holder.

The power control means 140 includes a pair of clutch disks 142 and 144. A first clutch disk 142 is connected with the rotary shaft 136 and is capable of moving axially, and rotating together with the shaft. The first clutch disk 142 has an uneven upper surface member 142*a* formed at an upper side, as shown in FIGS. 2 and 3.

The first clutch disk 142 is upwardly biased in an axial direction by a resilient member 146, and prevented by a pin 148 from being prevented to rotate with the rotary shaft 136. A support plate 150 supports the resilient member 146, and stop rings 152 and 154 are disposed concentrically around the shaft 136, stop ring 152 (shown in phantom) under the support plate and stop ring 154 between the two clutch disks 142 and 144.

A second clutch disk 144 is disposed underneath the cup holder 120 and is attached to or integrally formed with the cup holder 120. As shown in FIGS. 2 and 3, an uneven member 144*a* is formed on a lower surface of the second clutch disk 144 for engaging the uneven member 142*a* of the first clutch disk 142.

The uneven members 142*a* and 144*a* of the first and the second clutch disk 142 and 144, respectively, have sloping sides 142*b* and 144*b* (FIG. 3), and the uneven member 142*a* of the first clutch disk 142 and the uneven member 144*a* of the second clutch disk 144 are capable of engaging each other by means of the sloping sides 142*b* and 144*b*.

For a cup transfer device 100 of the vending machine according to the present invention and having the above construction, when the motor 132 operates, the power is transmitted as the uneven member 142*a* of the first clutch disk 142 and the uneven member 144*a* of the second clutch disk 144 engage each other (refer to FIG. 4).

At this time, the resilient member 146, which a first end secured to the support plate 150, urges the first clutch disk 142 toward the second clutch disk 144, and the power of the rotating shaft 136 is transmitted through the pair of clutch disks 142 and 144 to rotate the cup holder 120.

On the other hand, when an abnormal case arises, such as when rotation of the cup holder 120 is prevented during the normal operation of the motor 132, the power transmitted from the driving means 130 to the cup holder 120 is cut by the power control means 140.

Figure 5:
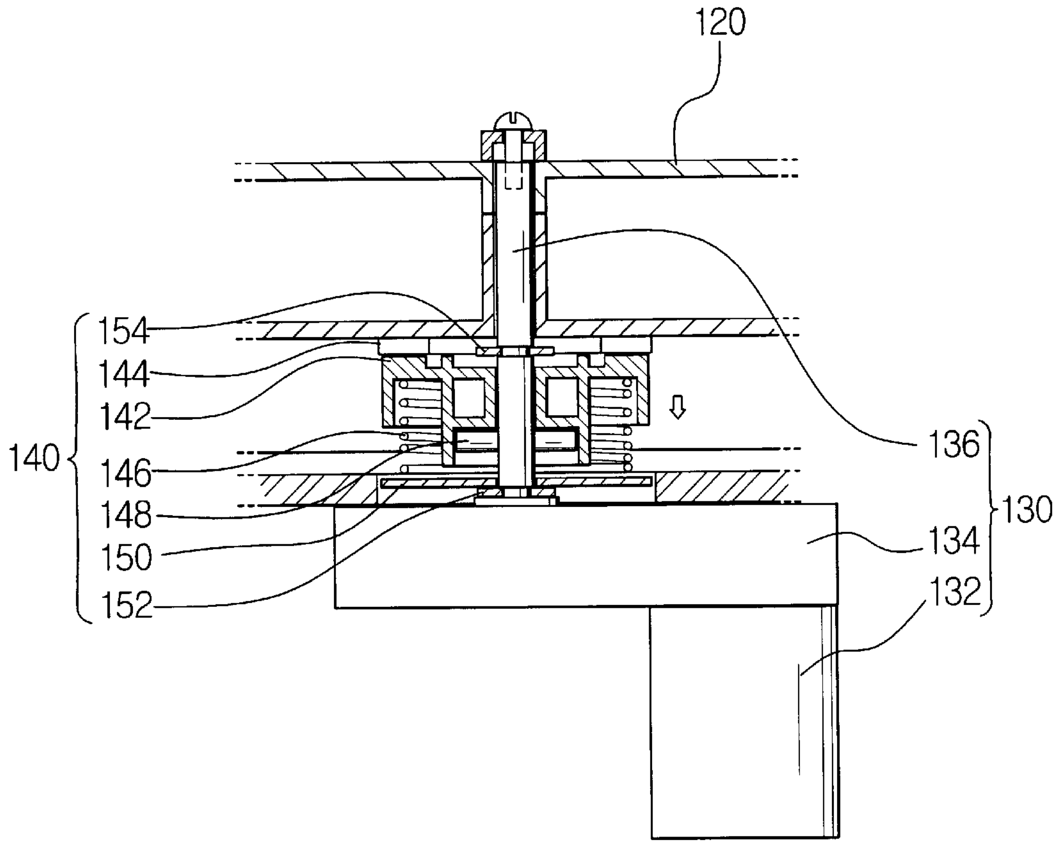
FIG. 5 is a cross-sectional view showing the status of the cup transfer means of FIG. 2 during the process of cutting off the power transmitted to the cup holder from a driving means by a power control means.

In other words, when the rotation of the cup holder 120 is hindered by some unexpected cause, the uneven member 142*a* of the first clutch disk 142 is separated from the uneven member 144*a* of the second clutch disk 144 by overcoming the urging force of the resilient member 146, as shown in FIG. 5, and the uneven surfaces of the clutch disks 142, 144 simply slide over each other. Therefore, the first clutch disk 142 and the second clutch disk 144 do not engage each other and are rotated idly relative to each other. Thus, the power transmitted from the driving means 130 to the cup holder 120 through the power control means 140 is not transferred from the shaft 136 to the cup holder 120.

Thus, according to the cup transfer device 100 of the vending machine of the present invention, even when the cup holder 120 cannot rotate actively, the cup transfer device 100, any peripheral objects in contact with the cup holder 120, and the motor 132 are prevented from being damaged.

Moreover, according to the cup transfer device 100 of the vending machine of the present invention, the safety of the user can be enhanced from the operation of the cup transfer device 100, even when the user's hand is inserted carelessly during the operation of the cup transfer device 100.

Although the preferred embodiment of the present invention has been described, it will be understood by those skilled in the art that the present invention should not be limited to the described preferred embodiment. Various changes and modifications can be made so to utilize the teachings of the present invention while simultaneously remaining within the spirit and scope of the present invention, as defined by the appended claims.

What is claimed is:

1. A cup transfer device of a vending machine, comprising:

a cup holder;

means for driving the cup holder, the driving means comprising a motor and a rotary shaft driven by the motor, wherein the driving means transmit the rotation force to the rotary shalt to drive the cup holder; and means for selectively controlling power transmitted from the driving means to the cup holder, the vower control means comprising:

a first clutch disk connected with the rotary shaft capable of moving in an axial direction;

a second clutch disk secured to the cup holder; and a resilient member for urging the first clutch disk in a direction toward the second clutch disk, wherein the power control means is capable of cutting off the rotation force in presence of an abnormal operating condition in the cup transfer device by separating the first and second clutch members by regulating the urging force of the resilient member.

2. A cup transfer device of a vending machine, comprising:

a cup holder;

means far driving the cup holder, the driving means comprising a motor and a rotary shaft driven by the motor, wherein the cup holder is rotatably connected with the rotary shaft, and means for selectively controlling power transmitted from the driving means to the cup holder, the power control means comprising:

a first clutch disk connected with the rotary shaft capable of moving in an axial direction;

a second clutch disk secured to the cup holder; and a resilient member for urging the first clutch disk in a direction toward the second clutch disk.

3. A cup transfer device of a vending machine comprises: a motor; a rotary shaft driven by the motor; a cup holder rotatably connected with the rotary shaft; a first clutch disk connected with the rotary shaft for moving in an axial direction; a second clutch disk secured to the cup bolder; and a resilient member for urging the first clutch disk in the direction of the second clutch disk, die first clutch disk and the second clutch disk comprising uneven members having sloping sides for engaging each other.

* * * * *